(12) United States Patent
Wang et al.

(10) Patent No.: US 10,626,794 B2
(45) Date of Patent: Apr. 21, 2020

(54) OTTO-CYCLE ENGINE

(71) Applicant: Hui Wang, Xuancheng, Anhui (CN)

(72) Inventors: Hui Wang, Anhui (CN); Ziwei Wang, Anhui (CN)

(73) Assignee: Hui Wang, Xuancheng, Anhui (CN)

( * ) Notice: Subject to any disclaimer, the term of this patent is extended or adjusted under 35 U.S.C. 154(b) by 0 days.

(21) Appl. No.: 16/114,214

(22) Filed: Aug. 28, 2018

(65) Prior Publication Data
US 2019/0063312 A1    Feb. 28, 2019

(30) Foreign Application Priority Data

Aug. 31, 2017    (CN) .......................... 2017 1 0770027

(51) Int. Cl.
| | | |
|---|---|---|
| *F02B 75/32* | (2006.01) | |
| *F16C 7/02* | (2006.01) | |
| *F01B 9/02* | (2006.01) | |
| *F02D 15/02* | (2006.01) | |
| *F02B 75/24* | (2006.01) | |
| *F16C 7/06* | (2006.01) | |
| *F02B 75/04* | (2006.01) | |
| *F02B 41/00* | (2006.01) | |
| *F02B 75/18* | (2006.01) | |
| *F01B 31/14* | (2006.01) | |

(52) U.S. Cl.
CPC ............... *F02B 75/32* (2013.01); *F01B 9/02* (2013.01); *F02B 41/00* (2013.01); *F02B 75/045* (2013.01); *F02B 75/243* (2013.01); *F02D 15/02* (2013.01); *F16C 7/023* (2013.01); *F16C 7/06* (2013.01); *F01B 31/14* (2013.01); *F02B 2075/1808* (2013.01); *F16C 2360/22* (2013.01)

(58) Field of Classification Search
CPC ................... F02B 75/32; F02B 75/243; F02B 2075/1808; F16C 7/023; F16C 3/04; F16C 3/18; F16C 3/22; F16C 11/02; F01B 9/02; F02D 15/02
See application file for complete search history.

(56) References Cited

U.S. PATENT DOCUMENTS

| | | | | |
|---|---|---|---|---|
| 5,907,981 A * | 6/1999 | Bell | .......................... | F01B 9/02 |
| | | | | 123/197.4 |
| 6,202,622 B1 * | 3/2001 | Raquiza, Jr. | ............ | F02B 75/32 |
| | | | | 123/197.4 |
| 2007/0295122 A1 * | 12/2007 | Garavello | ............... | F02B 75/32 |
| | | | | 74/44 |

FOREIGN PATENT DOCUMENTS

CN            105221239 A        1/2016

* cited by examiner

*Primary Examiner* — Jacob M Amick
(74) *Attorney, Agent, or Firm* — Wayne & Ken, LLC; Tony Hom

(57) ABSTRACT

An otto-cycle engine is disclosed. The engine of the present disclosure consumes less work than a traditional engine for the following reasons: (1) the engine adopts constant volume exhaust and reduces the work consumed by forced exhaust and (2) in an intake stroke, the piston has a short stay at the top dead center and an intake valve has enough time to open to the maximum, thereby reducing negative pressure and reducing the work consumed by intake. By adopting otto-cycle technology, heat efficiency of the engine can be increased by more than 50%. And meanwhile, by adopting constant volume exhaust technology, power loss can be reduced, vibration of the engine can also be greatly reduced and an effect of a boxer engine is achieved.

7 Claims, 8 Drawing Sheets

OTTO-CYCLE ENGINE

CROSS-REFERENCE TO RELATED APPLICATIONS

This application claims to Chinese application No. 201710770027.2 with a filing date of Aug. 31, 2017. The content of the aforementioned applications, including any intervening amendments thereto, are incorporated herein by reference.

TECHNICAL FIELD

The present disclosure relates to the technical field of engines, and particularly relates to an otto-cycle (constant-volume heating cycle) and bottom dead center constant-volume exhaust engine.

BACKGROUND

At present, most automobile engines are reciprocating piston engines which adopt a mixed heating cycle. Therefore, these engines have a low heat work conversion rate of about 28% to 33%. Thus, increasing the heat work conversion rate of the engines is very meaningful.

According to the existing combustion theory, the heat work conversion rate can be greatly improved by the otto cycle (i.e., constant-volume heating cycle). As shown in FIG. 8 in the accompanied drawings, when an isentropic exponent K=1.45 and a compression ratio εc=8, the heat work conversion rate ηt=60%. Although this heat work conversion rate greatly exceeds that of the existing best engine, when εc=10, the heat work conversion rate ηt can reach an amazing 70%, thereby increasing the heat work conversion rate of the engine by one grade.

SUMMARY

In view of the defects in the prior art, by adopting the otto-cycle (constant-volume heating cycle) technology, the heat efficiency of the engine can be increased by more than 50%. And meanwhile, by adopting constant volume exhaust technology, power loss can be reduced to realize a maximum heat work conversion rate of the engine, vibration of the engine can also be greatly reduced and an effect of a boxer engine is achieved.

To realize the otto cycle, the present disclosure improves a connecting rod and a crankshaft of a traditional engine by adopting the following technical solution:

The otto-cycle engine includes a connecting rod and a crank arm. A crank pin end of the connecting rod is connected to the crank arm through a connecting rod journal. The connecting rod journal is a cam journal. The cam journal includes a middle portion and two end portions. Two bulges are provided oppositely at the two end portions respectively. The two bulges are composed of journal bodies and cylinders. A section at the end of each journal body is oval, and two semicircular grooves are dug in the directions of both ends of a long axis. Half of the two cylinders are embedded into the grooves. The two cylinders can freely roll in the semicircular grooves. Then, the cylinders are sleeved by two "ears" onto the middle portion from both ends of the cylinders to prevent the cylinders from separating.

Preferably, bumps matched with the bulges are respectively disposed on two side surfaces of the crank pin end of the connecting rod.

Further, each of the bumps is arched. The bumps and the connecting rod form an integral structure. An arched spring piece is fixedly welded at an arched inner side of the bump. And arched portions of both ends of the arched spring piece are always contacted with the surfaces of the bulges, and slide on the surfaces of the bulges.

Preferably, the crank pin end of the connecting rod is connected to the middle portion of the cam journal. The crank pin end of the connecting rod is composed of a big end, an Ω-shaped fixture and a connecting rod cover. The big end of the crank pin end of the connecting rod, the Ω-shaped fixture and the connecting rod cover are penetrated by a threaded rod and matched and connected to nuts. And a spring clip is also disposed on the crank pin end of the connecting rod to clamp the big end of the connecting rod and the connecting rod cover together.

Preferably, the crank pin end of the connecting rod is connected to the middle portion of the cam journal and also includes a connecting rod bearing shell. The connecting rod bearing shell is sleeved on the middle portion of the cam journal, and the connecting rod bearing shell is sleeved by the Ω-shaped fixture and the connecting rod cover. The big end of the crank pin end of the connecting rod presents a semicircular arc surface and is matched with an upper arc surface of the Ω-shaped fixture. Screw holes are provided in the big end of the crank pin end of the connecting rod, the Ω-shaped fixture, the spring clip and the connecting rod cover. The threaded rod successively penetrates through an upper clip screw hole of the spring clip, the screw hole of the big end of the connecting rod, the screw hole of the Ω-shaped fixture, the screw hole of the connecting rod cover and a lower clip screw hole of the spring clip, and is tightened by the nut to connect.

Preferably, the crank arm is longer than the crank arm of a traditional engine of the same displacement and model by about 5 mm.

Preferably, half of the cylinders are embedded into the semicircular grooves, and can roll in the semicircular grooves.

Preferably, a connecting hole matched with the end portion of the cam journal having bulges is provided in the crank arm.

Preferably, a section at the end portion of the journal body is oval, and two semicircular grooves are located on both ends of an oval long axis.

Preferably, in this structure, when the crankshaft rotates to 20° CA before a highest point, the bulge at the end portion jacks up the bump on the side surface of the crank pin end of the connecting rod so as to jack up the connecting rod so that the piston reaches the top dead center in advance and always keeps a 20° Crank angle (CA) after the highest point. Thus, the piston is at the top dead center from 20° CA before the crankshaft highest point to 20° CA after the crankshaft highest point. A combustion process is completed during this period, and the volume of a combustion chamber is constant, thereby realizing the otto cycle. To prevent deflagration, the piston may be approximately at the top dead center when the crankshaft rotates 0° CA-20° CA after the highest point, thereby realizing approximate constant-volume heating cycle.

This structure can also realize bottom dead center constant-volume exhaust: when a working stroke of the piston moves down and reaches a bottom dead center, the crankshaft does not reach the lowest point but is at 30° CA before the lowest point of the crankshaft. At this moment, the bulge at the end portion of the cam journal jacks up the bump on the side surface of the big end of the connecting rod so that the connecting rod and the piston do not keep moving down, so as to ensure that the piston does not keep sliding down and separate itself from the cylinders. Then, the crankshaft continues to rotate, and the piston is always at the bottom dead center until the crankshaft rotates to 30° CA after the lowest point. During 60° CA, the engine freely exhausts, thereby avoiding "work loss caused by advanced exhaust", reducing the work consumed by forced exhaust and further increasing the heat work conversion rate of the engine.

Compared with the prior art, the present disclosure has the following advantages:

(1) In the present disclosure, the heat work conversion rate can be increased to more than 50% through the otto cycle, about 15% higher than the conversion rate of the current best engine. This is a great achievement which is even better than that of a high compression engine of Mazda.

(2) This engine realizes the bottom dead center constant-volume exhaust, and can reduce "work loss caused by advanced exhaust" compared with the traditional engines.

(3) The work consumed by forced exhaust can also be reduced by adopting the constant-volume exhaust.

(4) The piston of this engine has a short stay at the top dead center and the bottom dead center, thereby greatly reducing the vibration of the engine, and the effect of this engine is comparable to that of a boxer engine.

BRIEF DESCRIPTION OF THE DRAWINGS

Contents expressed in attached drawings in the description and reference numerals in the drawings are described briefly below.

In the figures.

1 cam journal; 2 two end portions of cam journal; 3 bulge I; 4 bulge II; 5 cylinder; 6 crank arm; 7 connecting rod cover; 8 middle portion of cam journal; 81 nut I; 82 nut II; 9 threaded rod; 10 spring clip; 11 Ω-shaped fixture; 12 connecting rod; 121 big end of crank pin end of connecting rod; 13 bump; 14 arched spring piece; 15 journal body; 16 ear; 17 connecting rod bearing shell; 18 piston; 19 top dead center; 20 crank angle before a highest point; 21 crank angle after a highest point; 22 crank angle before a lowest point; 23 bottom dead center; 24 crank angle after a lowest point; 25 crankshaft movement track of a traditional engine; 26 schematic point of a position of a main crankshaft journal of this engine; 27 schematic point of a position of a main journal of a traditional engine; 28 height difference of positions of main crankshafts of this engine and a traditional engine; 29 movement track of a bump on a connecting rod before and after a bottom dead center; and 30 crankshaft rotation track of this engine.

DETAILED DESCRIPTION

Specific embodiments of the present disclosure will be further described below in detail with reference to the drawings through the description of the embodiments.

In the present embodiment, by changing structure of a connecting rod of a piston and structure of a crankshaft, the piston reaches a top dead center 20° CA earlier in a compression stroke. Then the piston is always kept at the top dead center until the crankshaft reaches 20° CA after the highest point. And then ignition and combustion are conducted during 40° CA and the volume of the combustion chamber is constant, thereby realizing constant-volume heating cycle, i.e., otto cycle. Of course, 60% is a heat work conversion rate under ideal conditions when K is 1.45 and $\varepsilon c$ is 8. Under the influence of some practical factors, and to prevent deflagration, approximate constant-volume combustion is adopted, thereby realizing a heat work conversion rate above 50%.

By changing the structure of the connecting rod of the piston, and structure of the crankshaft, bottom dead center constant-volume exhaust can also be realized, namely: when the piston reaches a bottom dead center, the crankshaft does not reach the lowest point and is at 30° CA before the lowest point. By means of the improved connecting rod structure and the improved crankshaft structure, the piston is always at the bottom dead center and the crankshaft continues to rotate to 30° CA after the lowest point. During this period, the piston is always at the bottom dead center. Then, during 60° CA, the engine is always in a phase of freely exhausting, thereby realizing the bottom dead center constant-volume exhaust, reducing exhaust loss and reducing the work consumed by forced exhaust.

As shown in FIG. 1 to FIG. 8, the engine conducts constant-volume heating cycle at the top dead center and constant-volume exhaust at the bottom dead center.

Figure 1:
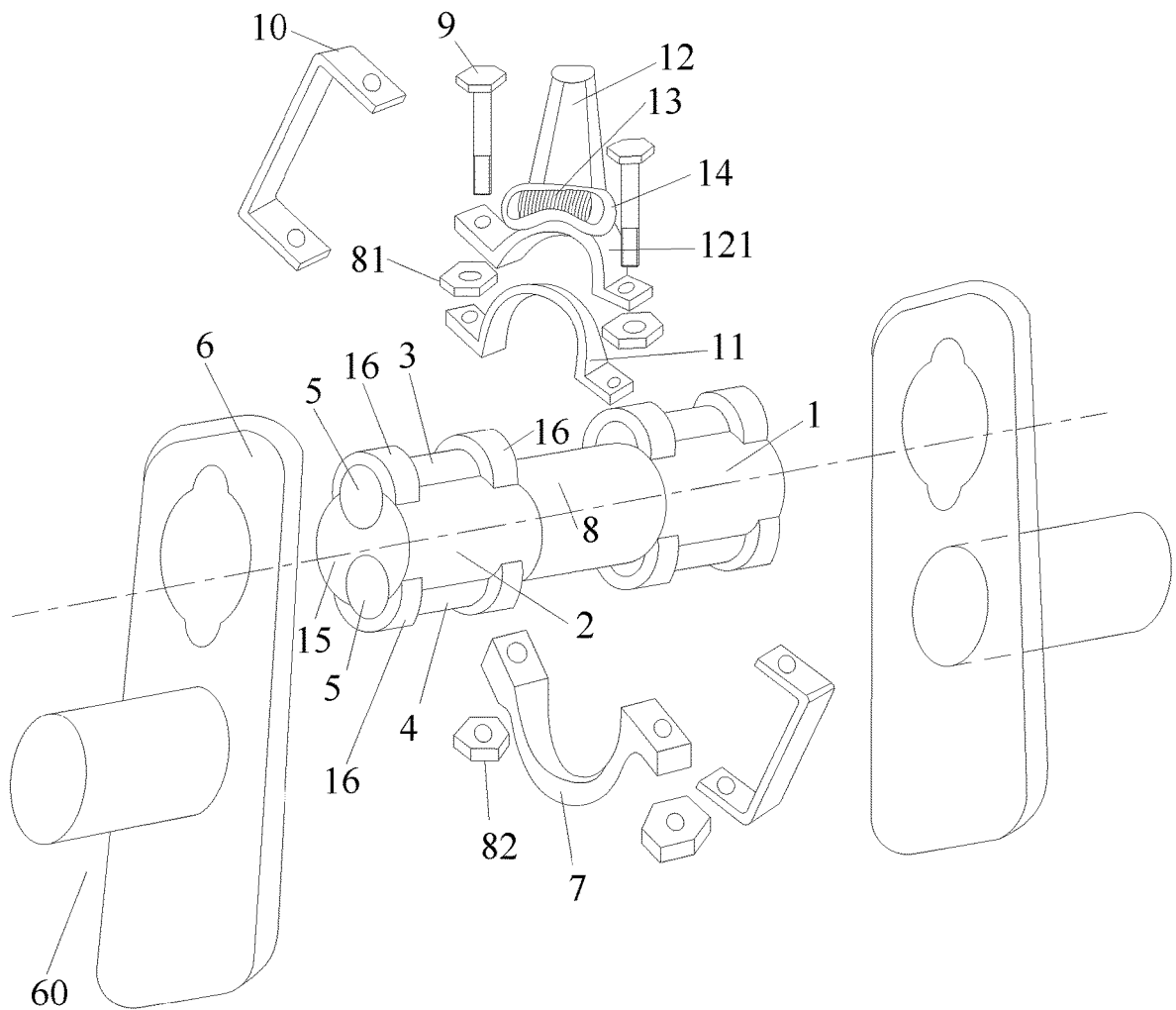
FIG. 1 is a structural schematic diagram of a crankshaft and a connecting rod in an embodiment of the present disclosure.

As shown in FIG. 1, the crankshaft includes a crank arm 6 and a connecting rod journal. The connecting rod journal is a cam journal 1. The cam journal 1 includes a middle portion 8 and two end portions 2. The two end portions 2 include journal bodies 15. And the cross sections of the journal bodies are oval. Two corresponding semicircular grooves are disposed at the end portions in the direction of an oval long axis. Two cylinders 5 are respectively disposed in the semicircular grooves to form two corresponding bulges. Both ends of the cylinders 5 are fixed into the semicircular grooves by ears 16, and the cylinders can freely roll in the semicircular grooves. The cam journal is composed of three portions: the middle portion is the same as that of a traditional journal, and two end portions form bulges (i.e., a bulge I and a bulge II) through the cylinders 5. The two bulges have the same shapes, and may have different heights. To differentiate the bulges, the bulges are respectively named as the bulge I and the bulge II, and the bulge II is higher. The specific structure of the bulges is as follows: half of the cylinders 5 are embedded into the grooves of the journal bodies 15, and the other half of the cylinders 5 are protruded to form bulges. The cylinders 5 can freely roll in the semicircular grooves. Both ends of the cylinders 5 are fixed by the ears without separating from the middle portion. And the other end of the cam journal 1 has the same structure.

In the figure, the crank pin end of the connecting rod 12 is connected to the middle portion 8 of the cam journal 1.

Figure 2:
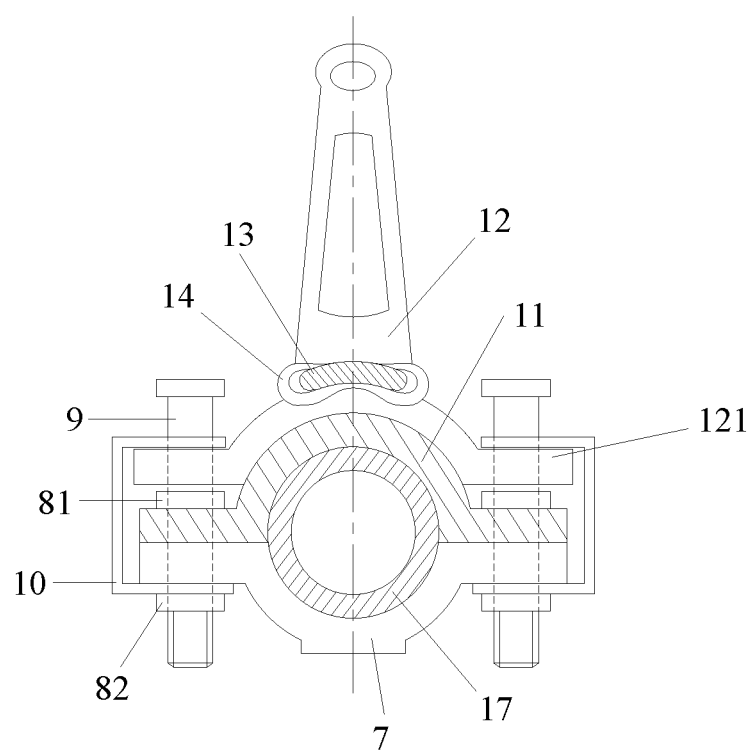
FIG. 2 is a structural schematic diagram of a connecting rod in an embodiment of the present disclosure.

As shown in FIG. 2, the crank pin end of the connecting rod 12 is connected to the middle portion 8 of the cam journal 1. Specifically, the connecting rod bearing shell 17 sleeves the middle portion 8 of the cam journal. The Ω-shaped fixture 11 and the connecting rod cover 7 sleeve the connecting rod bearing shell. The big end 121 of the crank pin end of the connecting rod contacts the upper arc surface of the Ω-shaped fixture 11. The lower portion of the big end 121 of the crank pin end of the connecting rod presents a semicircular arc surface, and is matched with the upper arc surface of the Ω-shaped fixture 11. And the spring clip 10 clamps the big end 121 of the crank pin end of the connecting rod and the connecting rod cover 7 together. Screw holes are provided in the big end of the crank pin end of the connecting rod, the Ω-shaped fixture, the spring clip and the connecting rod cover. The threaded rod 9 successively penetrates through an upper clip screw hole of the spring clip, the screw hole of the big end of the connecting rod, the screw hole of the Ω-shaped fixture, the screw hole of the connecting rod cover and a lower clip screw hole of the spring clip. The nut I 81 and the nut II 82 are tightened so that the Ω-shaped fixture 11 is fixedly connected to the connecting rod cover 7 to tightly wrap the connecting rod bearing shell 17. The big end 121 of the crank pin end of the connecting rod can slide up and down along the threaded rod 9. The spring clip 10 can enable the big end of the crank pin end of the connecting rod to approach the Ω-shaped fixture downwards.

In the figure, the crank pin end of the connecting rod is also provided with a bump 13, and the lower end surface of the bump 13 presents an arched arc surface. The arc surface is welded with an arched spring piece 14. Both ends of the arched spring piece 14 are always contacted with the end portion 2 of the previous cam journal, and a proper contact pressure exists. Moreover, both ends of the arched spring piece 14 can slide on the surface of the end portion 2 of the cam journal. The other side surface of the crank pin end of the connecting rod has the same structure.

Figure 3:
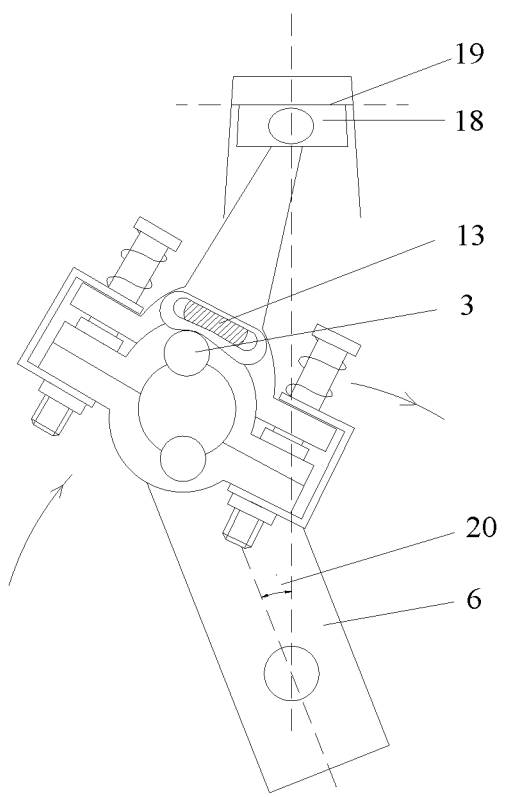
FIG. 3 is a schematic diagram of a crankshaft rotating clockwise to 20° CA before the highest point in an embodiment of the present disclosure.

As shown in FIG. 3, when the crankshaft clockwise rotates to 20° CA before the highest point, two bulges 3 of two end portions 2 of the cam journal respectively jack up the arched spring of two side surfaces of the connecting rod, and transfer an action force to the bump 13. The bump 13 drives the connecting rod to move up in advance and pushes the piston 18 to reach the top dead center in advance, namely: when the crankshaft moves to 20° CA before the highest point, the piston 18 already reaches the top dead center 19. Therefore, the piston of this engine can reach the top dead center 20° CA earlier. When the crankshaft continues to rotate clockwise, the cylinders 5 in the bulges 3 roll in an arc surface provided by the arched spring and the bump 13, and the piston is always kept at the top dead center until the crankshaft moves to 20° CA after the highest point, namely: the piston is always at the top dead center from 30° CA before the highest point to 20° CA after the highest point. Mixed gas is combusted during this period, and the volume of a combustion chamber is constant, thereby realizing the constant-volume heating cycle (otto cycle) and increasing the heat work conversion rate of the engine.

If the engine is in a phase of intake stroke, there is enough time to turn on an exhaust valve to the largest extent. Negative pressure generated during intake is smaller than that of the traditional engine and less work is consumed by intake.

In the figure, the arc surface provided by the arched spring and the bump 13 must have a right radian, so as to ensure that the piston is immobile at the top dead center or the arc surface provided by the arched spring and the bump 13 has a proper radian so that combustion is at approximate constant volume and the degree of constant volume is about 90%, thereby greatly increasing the heat work conversion rate. The approximate constant volume has two outstanding advantages: (1) deflagration can be avoided; and (2) processing accuracy can be reduced, and processing difficulty can be reduced.

The engine in the present disclosure is slightly different from the traditional engine: when the piston of the traditional engine reaches the top dead center, the crankshaft journal is also at the highest point and the piston and the crankshaft journal are synchronous. The piston of the engine in the present disclosure already reaches the top dead center 20° CA before the highest point, and the piston and the crankshaft are asynchronous. To facilitate later accurate description and right understanding, the "piston top dead center" and the "crankshaft highest point" will be distinguished and described in the present disclosure.

Figure 4:
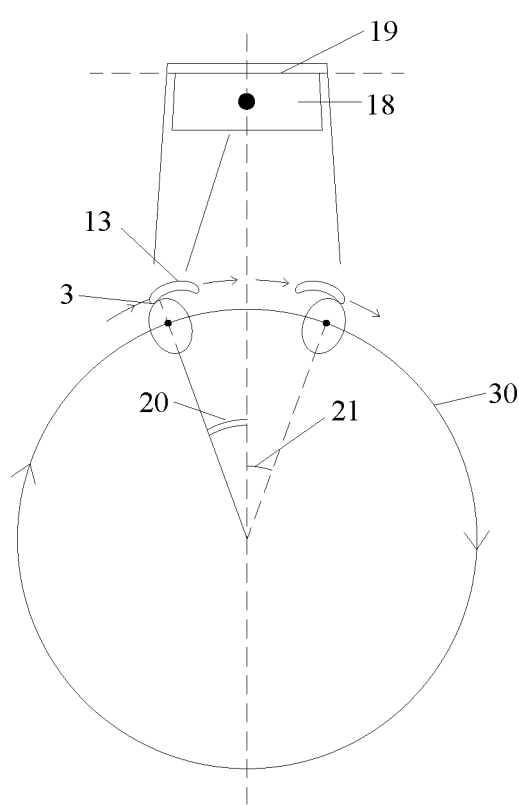
FIG. 4 is a schematic diagram of a bump movement track and a piston position when a crankshaft is at 20° CA before the highest point and 20° CA after the highest point in an embodiment of the present disclosure.

As shown in FIG. 4, when the crankshaft clockwise rotates to 20° CA before the highest point, the bulge I already jacks up the bump 13 so that the piston 18 reaches the top dead center 19 and the crankshaft continues to clockwise rotate to a crank angle 21 after the highest point. And the crank angle 21 after the highest point is equal to 20° CA. During the crank angle, the bulge I of the cam always jacks up the bump 13 so that the piston 18 is always at the top dead center 19. Thus, the piston of the engine is at the top dead center from 20° CA before the highest point to 20° CA after the highest point. The engine completes the combustion process during 40° CA, and the volume of the combustion chamber is constant, thereby realizing constant volume combustion, generating larger pressure and greatly increasing expansion work. Thus, the heat work conversion rate is greatly increased.

Figure 5:
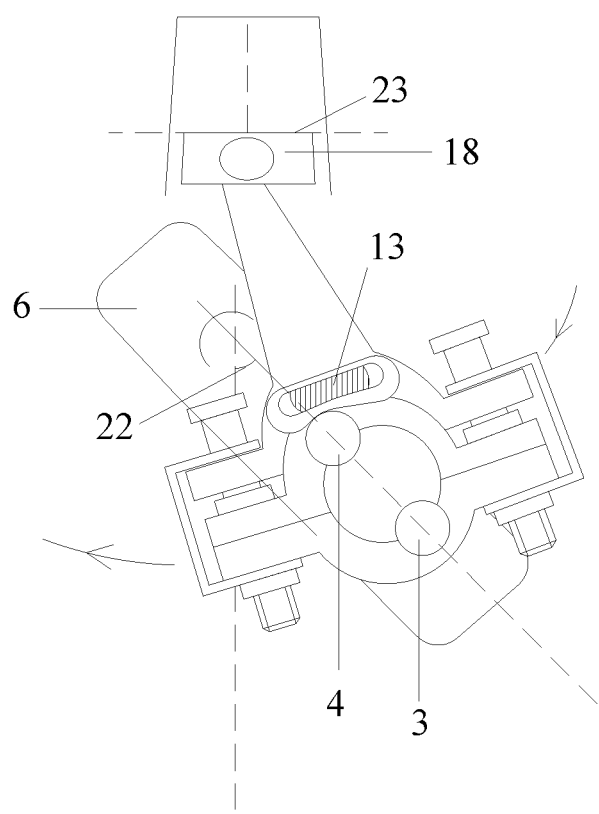
FIG. 5 is a schematic diagram of a crankshaft rotating clockwise to 30° CA before the lowest point in an embodiment of the present disclosure.

As shown in FIG. 5, when the crankshaft clockwise rotates to 30° CA before the lowest point, the bulge II jacks up the bump 13 so that the connecting rod 12 does not continue to move down and the piston 18 is constant at the bottom dead center 23. At this moment, the crank angle 22 before the lowest point is equal to 30° CA. It is explained above that the bulge II is higher than the bulge I. Therefore, the crank angle at which the bulge II jacks up the bump 13 is also greater than the crank angle at which the bulge I jacks up the bump 13. Thus, the bulge II jacks up the bump 13 at 30° CA before the lowest point.

Figure 6:
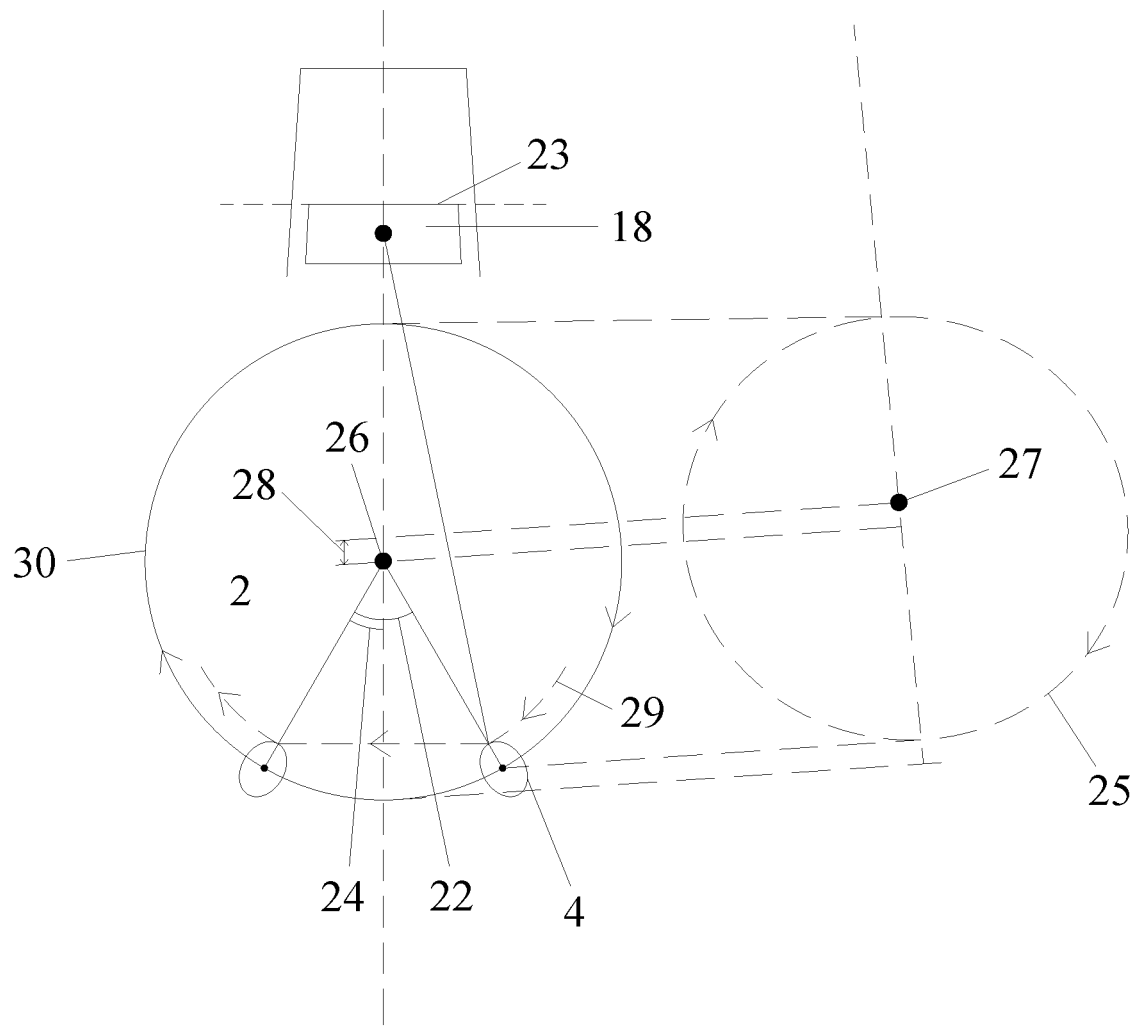
FIG. 6 is a schematic diagram of a bump movement track and a piston position when a crankshaft is at 30° CA before the lowest point and 30° CA after the lowest point in an embodiment of the present disclosure.

As shown in FIG. 6, a track 25 is a crankshaft movement track of the traditional engine. A schematic point 27 is a schematic point of a position of the main journal of the traditional engine and a schematic point 26 is a schematic point of a position of the main journal of this engine. A height difference 28 is a height difference of the positions of the main journals of this engine and the traditional engine. A track 29 is a bump movement track and a track 30 is a crankshaft rotation track of this engine. It can be discovered through comparison that, the crank arm of this engine is slightly longer than the crank arm of the traditional engine. Therefore, when the crankshaft clockwise rotates to 30° CA before the lowest point, the piston 18 already reaches the bottom dead center 23. At this moment, the bulge II jacks up the bump 13 so that the connecting rod does not continue to move down and the piston 18 is constant at the bottom dead center 23 up to a crank angle 24 after the lowest point. The crank angle 24 after the lowest point is equal to 30° CA. The volume of the cylinders is constant, thereby realizing constant volume exhaust. The constant volume exhaust does not reduce the expansion work, and subsequent free exhaust time is enough, thereby reducing the loss caused by forced exhaust.

Figure 7:
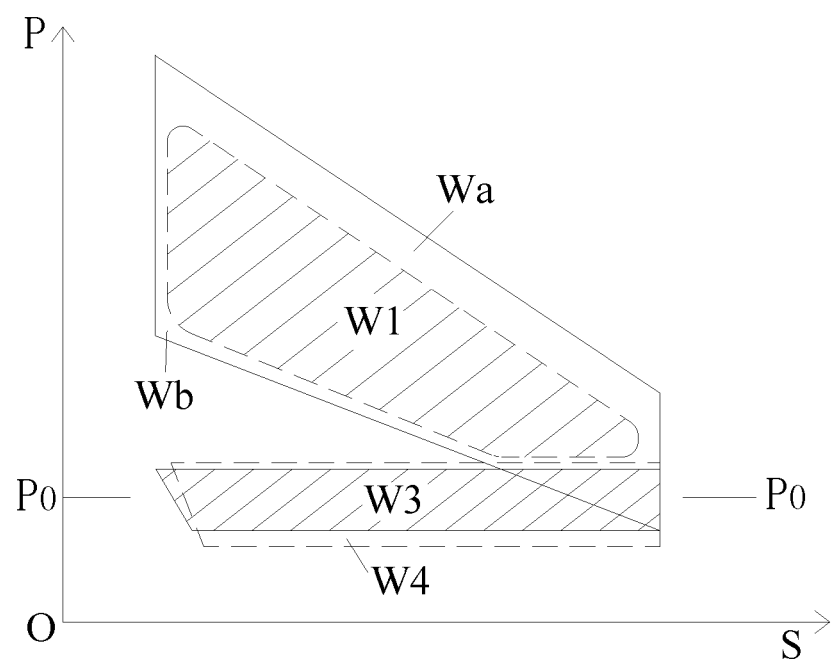
FIG. 7 shows comparison of indicator diagrams of an engine in an embodiment of the present disclosure and a traditional engine.

FIG. 7 shows comparison of indicator diagrams of this engine and the traditional engine. In the figure, a horizontal coordinate S indicates a piston stroke, a vertical coordinate P indicates a pressure in the cylinder and P0 indicates outside atmospheric pressure. In the figure, the area W1 surrounded by upper dashed lines is the work made by the traditional engine, and the area surrounded by solid lines is the work made by this engine. Apparently, because the otto cycle is adopted, the pressure generated by combustion of this engine is higher than that of the traditional engine. Thus, work Wa is increased. Moreover, because the piston of this engine reaches the top dead center in advance, negative work Wb is not produced due to advanced ignition. Therefore, the engine of the present disclosure has work Wa and work Wb which are not possessed by the traditional engine, and increases the heat work conversion rate by more than 15%. In the figure, the area W4 surrounded by lower dashed lines is the work consumed by the traditional engine in the intake stroke, the compression stroke and forced exhaust, and the W3 surrounded by solid lines is the work consumed by this engine. Apparently, W4 is larger than W3. The work consumed by this engine is less than that of the traditional engine for the follow two reasons: (1) this engine adopts the constant volume exhaust and reduces the work consumed by forced exhaust and (2) in the intake stroke, the piston has a short stay at the top dead center and an intake valve has enough time to open to the maximum, thereby reducing negative pressure and reducing the work consumed by intake.

Figure 8:
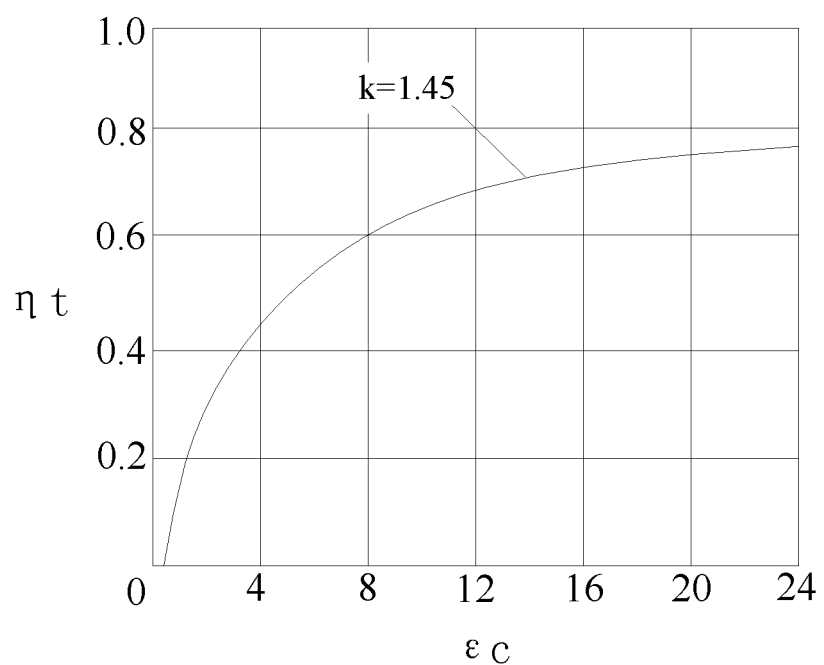
FIG. 8 is a relationship diagram of efficiency and a compression ratio of constant-volume heating cycle.

FIG. 8 shows a relationship of heat efficiency and a compression ratio of the otto cycle. According to the existing combustion theory, the heat work conversion rate can be greatly improved by the otto cycle (i.e., constant-volume heating cycle). When an isentropic exponent K=1.45 and a compression ratio εc=8, the heat work conversion rate ηt=60%. Although this heat work conversion rate greatly exceeds that of the existing best engine, when εc=10, the heat work conversion rate ηt can reach an amazing 70%, thereby increasing the heat work conversion rate of the engine by one grade.

It should be understood that those ordinary skilled in the art may make improvements or transformations according to the above instructions, and all of the improvements and transformations shall fall within the protection scope of the attached claims of the present disclosure.

The above is an exemplary description of the patent of the present disclosure. Apparently, the realization of the patent of the present disclosure is not limited by the above embodiments. Various improvements made by adopting the method concept and the technical solution of the patent of the present disclosure or the direct application of the concept and the technical solution of the patent of the present disclosure without improvement in other occasions shall belong to the protection scope of the present disclosure.

What is claimed is:

1. An otto-cycle engine, comprising a crankshaft and a connecting rod; wherein the crankshaft comprises a crank arm and a connecting rod journal; a bump structure is provided on the connecting rod; a cam structure is provided on the connecting rod journal; the connecting rod journal is a cam journal comprising a middle portion and two end portions; two bulges are provided oppositely at the two end portions respectively; the bump structure is matched with the two bulges; the connecting rod is connected to the connecting rod journal through a connecting assembly so that the connecting rod journal can rotate and move up and down relative to the connecting rod; the bump structure corresponds to the cam structure; the connecting rod journal is fixedly connected to the crank arm; and when the crankshaft rotates, the bump structure cooperates with the cam structure to achieve an otto cycle or an approximate otto cycle.

2. The otto-cycle engine according to claim 1, wherein the cam journal comprises a journal body and a cylinder; a section at an outer end of the journal body is oval; a semicircular groove is provided oppositely along a long-axis direction of the section; and the cylinder is matched with the semicircular groove, is limited to the semicircular groove and can freely roll in the semicircular groove, to form the bulges.

3. The otto-cycle engine according to claim 1, wherein a bump is disposed at an outer side surface opposite to a crank pin end of the connecting rod; and the bump is matched with the bulges.

4. The otto-cycle engine according to claim 3, wherein the bump and the connecting rod form an integral structure; the bump is arched; a spring piece is fixedly disposed at an arched inner side of the bump; and the spring piece has a shape of an arch, is always in contact with the cam journal and is in sliding contact with the cylinder.

5. The otto-cycle engine according to claim 1, wherein a big end of the connecting rod is connected to the middle portion of the cam journal through the connecting assembly; the connecting assembly comprises a bushing assembly, a threaded rod, a nut and a spring clip; the bushing assembly is sleeved on the middle portion of the cam journal; the big end of the connecting rod is connected to the bushing assembly through the threaded rod, the nut and the spring clip; the connecting rod can slide along the threaded rod; and the spring clip clamps the big end of the connecting rod and the bushing component together.

6. The otto-cycle engine according to claim 5, wherein the bushing assembly comprises an Ω-shaped fixture, a connecting rod cover and a connecting rod bearing shell; the connecting rod bearing shell is sleeved on the middle portion of the cam journal; and the fixture and the connecting rod cover are matched and clamped on the connecting rod bearing shell, and are fixed through the threaded rod and the nut.

7. The otto-cycle engine according to claim 1, wherein heights of the two bulges are different.

* * * * *